US005917444A

United States Patent [19]
Loomis et al.

[11] Patent Number: 5,917,444
[45] Date of Patent: *Jun. 29, 1999

[54] REDUCTION OF TIME TO FIRST FIX IN AN SATPS RECEIVER

[75] Inventors: Peter V. W. Loomis, Sunnyvale; Ralph Eschenbach, Woodside; Paul Braisted, San Jose; Chung Lau, Sunnyvale, all of Calif.

[73] Assignee: Trimble Navigation Ltd., Sunnyvale, Calif.

[ * ] Notice: This patent is subject to a terminal disclaimer.

[21] Appl. No.: 08/561,086

[22] Filed: Nov. 20, 1995

Related U.S. Application Data

[63] Continuation-in-part of application No. 08/445,852, May 22, 1995, abandoned.

[51] Int. Cl.[6] ...................................................... G01S 5/02
[52] U.S. Cl. ................................................................ 342/357
[58] Field of Search .................................... 342/352, 357, 342/418

[56] References Cited

U.S. PATENT DOCUMENTS

| | | | |
|---|---|---|---|
| 5,101,356 | 3/1992 | Timothy et al. | 342/352 |
| 5,061,936 | 10/1991 | Suzuki | 342/359 |
| 4,384,293 | 5/1983 | Deem et al. | |
| 4,426,712 | 1/1984 | Gorski-Popiel | 375/343 |
| 4,445,118 | 4/1984 | Taylor et al. | 342/357 |
| 4,910,525 | 3/1990 | Stulken | 342/418 |
| 4,968,981 | 11/1990 | Sekine | 342/356 |
| 4,998,111 | 3/1991 | Ma et al. | 342/352 |
| 5,021,792 | 6/1991 | Hwang | 342/357 |
| 5,036,329 | 7/1991 | Ando | 342/357 |
| 5,059,969 | 10/1991 | Sakaguchi et al. | 342/352 |

(List continued on next page.)

OTHER PUBLICATIONS

Tom Logsdon, *The NAVSTAR Global Postioning System*, Van Nostrand Reinhold, 1992, pp. 17–90.

GPS Inteface Control Document ICD–GPS–200, Rockwell International Corp., Satellite Systems Div., Rev. B–PR, Jul. 3, 1991.

Moller, The Theory of Relativity, Oxford Clarendon Press, 1st Ed., 1952, pp. 62.

Moller "The Theory of Relativity" Oxford, Clarendon Press 1st Ed 1952 pp. 62.

Provisional Application 60/005318 Krasner, Oct. 9, 1995 pp. 1–31, 5 sheets of drawings.

*Primary Examiner*—Gregory C. Issing
*Attorney, Agent, or Firm*—John Schipper

[57] ABSTRACT

A method for fast acquisition, in as little as 6–15 seconds, of signals from a satellite in a Satellite Positioning System (SATPS), such as GPS or GLONASS, that does not require permanent storage of satellite ephemeris information at an SATPS ground station. This SATPS signal acquisition method can be used whenever the "new" station initially powers up or has lost lock on one or more SATPS signals that must be (re)acquired. A reference SATPS station provides the new SATPS station with an estimated reference station location and ephemeris information for one or more identified SATPS satellites visible from the reference station. The new station receives and uses this information to establish carrier frequency ranges to search for the identified SATPS satellite, by limiting the search to a reduced frequency range based upon estimated Doppler shift of SATPS signals received from this satellite. The actual frequency shift may differ from the estimated Doppler shift, due in part to errors in a frequency source used by the new station. When a first SATPS satellite signal is acquired and locked onto by the new station, the error in the new station frequency source is estimated, and the frequency range for searching for an SATPS signal from another satellite is reduced. Acquisition of additional SATPS satellite signals occurs more quickly. This system also allows the use of less accurate timing sources for the new stations. A new station need not store ephemeris information for the SATPS satellites but may call upon and use the ephemeris information available at the reference station.

12 Claims, 4 Drawing Sheets

U.S. PATENT DOCUMENTS

| | | | |
|---|---|---|---|
| 5,119,504 | 6/1992 | Durboraw | 455/54.1 |
| 5,146,231 | 9/1992 | Ghaem et al. | 342/357 |
| 5,155,491 | 10/1992 | Ando | 342/357 |
| 5,177,490 | 1/1993 | Ando et al. | 342/357 |
| 5,185,761 | 2/1993 | Kawasaki | 342/352 |
| 5,192,957 | 3/1993 | Kennedy | 342/357 |
| 5,203,030 | 4/1993 | Kawasaki | 455/164.2 |
| 5,347,284 | 9/1994 | Volpi et al. | 542/356 |
| 5,373,531 | 12/1994 | Kawasaki | 375/200 |
| 5,379,320 | 1/1995 | Fernandes et al. | 375/20 |
| 5,402,347 | 3/1995 | McBurney et al. | 342/357 |
| 5,418,538 | 5/1995 | Lau | 342/357 |
| 5,420,593 | 5/1995 | Niles | 342/357 |
| 5,432,521 | 7/1995 | Siwiak et al. | 342/357 |
| 5,663,734 | 9/1997 | Krasner | 342/357 |
| 5,666,122 | 9/1997 | Carter | 342/357 |

REDUCTION OF TIME TO FIRST FIX IN AN SATPS RECEIVER

This application is a continuation in part of a patent application entitled "Rapid SATPS Signal Acquisition Using Ephemerides Information", U.S. Ser. No. 08/445,852 now abandoned, assigned to the Assignee of this application. This invention relates to rapid initial acquisition or reacquisition of location determination signals from a Satellite Positioning System, such as a Global Positioning System or a Global Orbiting Navigation Satellite System.

FIELD OF THE INVENTION

BACKGROUND OF THE INVENTION

When a Satellite Positioning System (SATPS) receiver/processor powers up, or when the receiver/processor experiences SATPS signal interruption, if the receiver/processor has no almanac that indicates the present location of the visible SATPS satellites, the receiver/processor and associated SATPS antenna will perform a blind satellite search to find a sufficient number of SATPS satellites, usually three or more, to begin establishing the antenna's SATPS-determined location and/or proper time. The SATPS antenna and receiver/processor will usually select SATPS satellite numbers at random for the search. This procedure will often consume several tens of seconds before "lock" on an adequate number of SATPS satellite signals is achieved. For an SATPS receiver/processor with five or more channels, this time to first fix ("TTFF") is of the order of 60–100 seconds, or longer. An SATPS signal receiver/processor with fewer channels will often have a longer TTFF, as much as 120–180 seconds. Workers in electrical communications have disclosed methods and/or apparati for reducing the time or difficulty of acquiring signals communicated from satellites.

U.S. Pat. No. 4,384,293, issued to Deem et al, discloses apparatus for providing pointing information, using one or more GPS satellites and two antennas spaced apart about ten carrier signal wavelengths. The difference in phase of GPS signals received by the two antennas determines the pointing direction determined by the line of sight between the two antennas. Phase differences of GPS signals received by arrays of three or more collinear or non-collinear antennas are used to determine the attitude of an object on which the antennas are mounted in U.S. Pat. No. 5,021,792, issued to Hwang, and in U.S. Pat. No. 5,101,356, issued to Timothy et al.

Use of faster-than-real-time signal correlators, together with GPS code signals that are stored in memory at a GPS station, to provide a plurality of virtual channels for initially acquiring and tracking GPS satellites is disclosed by Gorski-Popiel in U.S. Pat. No. 4,426,712.

Taylor et al, in U.S. Pat. No. 4,445,118, disclose generation and transmission of an initial signal from a first ground-based station to a second ground-based station, to aid in acquisition of signals from GPS satellites by the second station. This initial signal provides coordinates of in-view GPS satellites with the best geometry and elevation and estimates Doppler shifts for these satellites, to simplify equipment at the second station.

A system for audibly verifying initial acquisition of signals from a selected GPS satellite is disclosed in U.S. Pat. No. 4,910,525, issued to Stulken. A Doppler-shifted GPS signal is mixed with a local oscillator signal having an adjustable frequency and is filtered to produce an audio beat frequency signal, whose presence indicates presence of a GPS signal from the selected satellite.

U.S. Pat. No. 4,968,981, issued to Sekine, discloses GPS receiver apparatus that quickly maximizes correlation between a received GPS pseudo-random noise (PRN) code and an internally stored GPS code. This approach uses a separate channel for each of N PRN codes and shifts the phase of the internally stored code n/2 bits at a time (n=1, 2, ..., N), in a search for a position of increased code correlation value.

Fast Fourier Transform analysis of a received composite of GPS satellite signals is used to acquire and track signals from in-view GPS satellites in U.S. Pat. No. 4,998,1111, issued to Ma et al. The FFT analysis identifies which signals are present with suitable strength, based on expected Doppler shifts of the incoming signals.

In U.S. Pat. No. 5,036,329, Ando discloses a satellite reacquisition or initial acquisition method applicable to GPS satellites. Using an estimate of the average Doppler shifted frequency $f_{avg}$ manifested by the GPS signals received from a visible GPS satellite, a narrow band search is first performed in the frequency range $f_{avg}-8600$ Hz$<f<f_{avg}+8600$ Hz. If no GPS satellite signals are found in this range within 3.75 minutes, the search range is widened until at least one GPS satellite signal is found.

A simultaneous multi-channel search for reacquisition of GPS satellite signals after signal interruption occurs is disclosed by Sakaguchi and Ando in U.S. Pat. No. 5,059,969. This method first searches for the GPS satellite with the highest elevation angle relative to the GPS antenna and receiver/processor. Two or more sequences of signal frequency ranges are swept over in parallel until at least one GPS signal is reacquired.

U.S. Pat. No. 5,061,936, issued to Suzuki, discloses attitude control for a rotationally mobile antenna. If the strength of the initial signal received by the antenna from a spacecraft (whose position is yet unknown) is below a first selected threshold and above a second selected threshold, the antenna attitude is scanned over a relatively small range, to increase the signal strength toward or above the first threshold value. If the signal strength is initially below the second threshold, the antenna attitude is scanned over a larger range, to increase the signal strength above the second threshold value so that a smaller range antenna scan can be implemented.

Durboraw, in U.S. Pat. No. 5,119,504, discloses a satellite-aided cellular communications system in which a subscriber unit self-determines its own (changing) location and transmits this information to the satellites for use in subsequent communications. This requires that each subscriber unit transmit and receive signals, and one subscriber unit does not communicate directly with, or provide satellite location information for, another subscriber unit.

An electronic direction finder that avoids reliance on sensing of terrestrial magnetic fields for establishing a preferred direction for satellite signal acquisition is disclosed by Ghaem et al in U.S. Pat. No. 5,146,231. The apparatus uses a receiver/processor for GPS or similar navigation signals received from a satellite, and requires (stored) knowledge of the present location of at least one reference satellite from which signals are received. The orientation of the finder or its housing relative to a line of sight vector from the finder to this reference satellite is determined. This orientation is visually displayed as a projection on a horizontal plane. Any other direction in this horizontal plane can then be determined with reference to this projection from a knowledge of the reference satellite location.

Ando, in U.S. Pat. No. 5,155,491, discloses a method for tracking radio signals from GPS satellites that follow a single orbit around the Earth. At most four GPS satellites follow one of the six GPS orbits, as the constellation is presently configured. The C/A-code and/or P-code is known for each of the at-most-four GPS satellites in a single orbit so that searching along a single orbit requires acquisition of only one of the four known codes associated with these satellites, and at least one of these four GPS satellites is not visible at a particular observation time. After acquisition of whatever GPS satellites on a particular GPS orbit can be tracked, the system moves sequentially from one GPS orbit to another orbit until all trackable GPS satellites are found. The system then selects the three or four GPS satellites that are most suitable for global positioning computations.

In U.S. Pat. No. 5,177,490, Ando et al disclose a GPS signal tracking system that rapidly recaptures a lost signal by repeatedly performing a narrow band search for a selected incoming signal, over a specified search time interval, centered along a Doppler shift curve for the selected signal, and performing a wider band search at the same time.

Parallel searches by different GPS receiver channels over a divided frequency range for a given satellite, to reduce the time required for satellite signal acquisition, is disclosed by Kawasaki in U.S. Pat. No. 5,185,761.

Kennedy discloses use of time multiplexing to sequentially search for signals from each of a selected group of GPS satellites, in U.S. Pat. No. 5,192,957. Incoming signals are converted from analog to digital form at an intermediate frequency before signal processing. The channel estimates several parameters for the incoming signal from each in-view satellite as an aid to signal (re)acquisition.

U.S. Pat. No. 5,203,030, issued to Kawasaki, discloses inactivation of a phase locked loop (PLL), used for GPS code phase signal searching and acquisition, until the intensity of a signal demodulator exceeds a threshold intensity, to reduce the time required for acquisition.

Use of each of a plurality of GPS receiver channels to search for incoming L1 and L2 signals from a selected satellite is disclosed by Volpi et al in U.S. Pat. No. 5,347,284. Incoming analog signals are converted to digital signals before processing and signal acquisition begins. P-code and Y-code searching is provided for here.

Kawasaki discloses a method for rapid signal (re) acquisition using a code search circuit that uses a stored code for a selected GPS satellite, in U.S. Pat. No. 5,373,531. The code search circuit output signal is EXclusively NORed with the output signals of an in-phase signal register and of a quadrature signal register to determine presence of a signal from the selected satellite. Satellite almanac data for the last location fix are not used for signal reacquisition and thus need not be stored on the receiver.

In U.S. Pat. No. 5,379,320, Fernandes et al disclose initial acquisition of only the strongest incoming GPS signal, followed by acquisition of these signals approximately in order of decreasing signal strength.

McBurney et al, in U.S. Pat. No. 5,402,347, disclose uses of parallel searches, followed by split searches, to reduce GPS signal acquisition time. A first parallel search is performed on adjacent sections of a Doppler shift spectrum for a signal from a selected satellite. If the desired signal is not found after a predetermined time interval, a split search is performed for other signals.

A rapid GPS signal acquisition method, not requiring use of satellite almanac permanently stored at a mobile station, is disclosed by Lau in U.S. Pat. No. 5,418,538. A nearby GPS reference station provides the mobile station with differential GPS information, which is used to limit the search to pseudorandom noise codes for only the in-view satellites.

Method and apparatus for rapid GPS code phase signal acquisition is disclosed by Niles in U.S. Pat. No. 5,420,593. Incoming signals are sampled at 5.17 MHz and are read out at twice the sampling rate to allow faster searches for the correct pseudorandom noise code and associated phase. Once a code lock is obtained, Doppler, code, code phase and ephemeris data are acquired and stored for subsequent use in tracking.

These methods usually require storage of detailed information on the satellite trajectories or of satellite signal indicia. This information for SATPS satellites can be voluminous and is not present in many SATPS signal receiver/processor systems. What is needed is a method that relies only upon information that is already available within the receiving system or from another nearby receiving system. Preferably, the method should provide reasonably accurate information on the present location of any visible SATPS satellite, should allow rapid acquisition of SATPS signals from one or a plurality of visible SATPS satellites, and should not require consumption of much additional power for operation.

SUMMARY OF THE INVENTION

The invention focuses on initial acquisition (at the time of power-up), reacquisition (after loss of lock) and identification of visible SATPS satellites by an SATPS station that includes an SATPS signal antenna and SATPS receiver/processor. Receipt of differential SATPS signals from another already-operative SATPS (reference) station allows the "new" SATPS station that is searching for satellite lock to reduce the Time To First Fix by as much as an order of magnitude, allows use of less expensive timing sources, and allows receipt and storage by the new station of ephemerides and almanac data that will be needed later. This allows quicker acquisition of the visible SATPS satellites upon (re) acquisition of satellite lock.

In one embodiment, the method includes the steps of: (1) receiving differential SATPS ("DSATPS") correction information (optional) and selected satellite ephemerides, almanac, ionosphere and/or time information from a nearby SATPS reference station, whose location coordinates are known with high accuracy, where the (optional) DSATPS information may include the pseudorange corrections and/or other relevant code phase or carrier phase attributes and satellite index of each SATPS satellite that is visible from the reference station (referred to as an SATPS "reference/visible" satellite); (2) determining the reference/visible satellites that are visible from the new SATPS station (referred to as an the "new station/visible" satellites); (3) establishing a selected number of one or more SATPS receiver/processor channels to receive and process SATPS signals from at least one reference/visible satellite; (4) stepping through the SATPS signal attributes for at least one reference/visible satellite to acquire and lock onto the SATPS signals from at least one of these SATPS satellites; (5) as soon as at least one SATPS satellite signal is acquired, narrowing the frequency tuning range of all the other tuning channels to a smaller frequency range, based upon an estimated frequency source error and Doppler shift frequency for at least one additional satellite; and (6) using this smaller frequency range to more quickly acquire and lock onto additional SATPS satellite signals, if needed. The DSATPS corrections and ephemerides, almanac, ionosphere and/or time information are repeatedly broadcast by a ground-based (or satellite-based) reference station transmitter, using any suitable communications link, such as a cellular telephone or an FM subcarrier signal transmitter. This procedure allows (re) acquisition of satellite lock for a first satellite in as little as 6–15 seconds, or less in some fortuitous circumstances. The reference station transmitter may be operated independently of, or as part of, the reference station. After this (re) acquisition of first satellite lock, (re)acquisition of lock for the remaining new station/visible satellites is performed more quickly. The new station can use the ephemerides, almanac and ionosphere information to acquire lock on four satellites and begin to navigate in as little as 22–55 seconds.

In another embodiment, ephemerides, almanac and/or ionosphere data and satellite orbital data are directly received and stored at the new station and are used to limit the frequency range to be searched by the new station to acquire or lock onto the first-acquired and subsequent SATPS signals.

Limiting the search for SATPS satellite signals to the reference/visible SATPS satellites for which relevant SATPS information is available provides the following benefits. First, as each reference/visible satellite signal is acquired and identified, the frequency range that needs to be searched for that satellite can be narrowed substantially, using an estimate of the Doppler shift for signals emitted from that satellite that is stored at the new station or that is also broadcast by the reference station transmitter. Second, the current ephemerides, almanac, ionosphere and/or time information is periodically loaded into the new station SATPS receiver/processor so that such information is already available when (re)acquisition of satellite lock is attempted. Third, an inexpensive time base source for a new station SATPS receiver/processor can be used without incurring a large penalty in satellite signal acquisition time. After one satellite signal is locked onto, the new station SATPS receiver/processor can correct for the (relatively large) frequency error of the associated time base and can search over a smaller frequency range that covers the appropriate Doppler shifted frequencies received.

DESCRIPTION OF BEST MODE OF THE INVENTION

Figure 1:
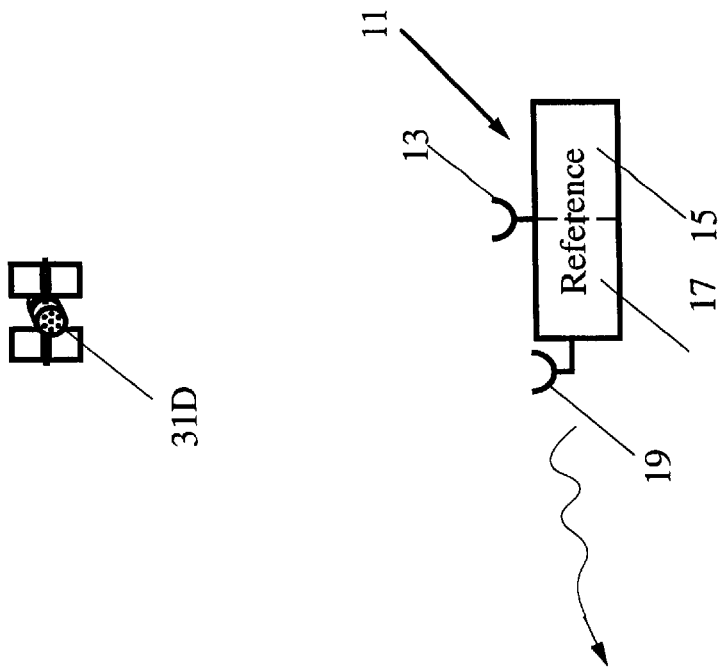
FIG. 1 is a schematic view of a differential satellite positioning system in operation, showing an SATPS reference station, a DSATPS transmitter and an SATPS new station that receives DSATPS information.
Figure 1:
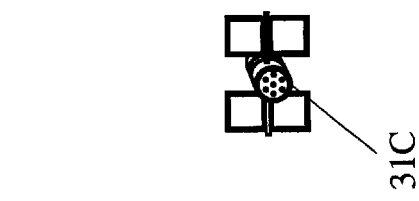
Figure 1:
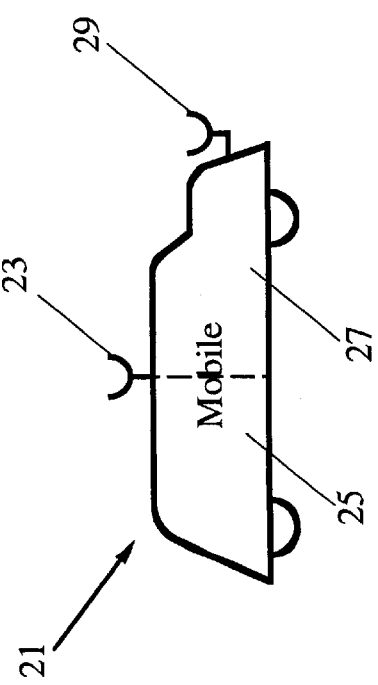

FIG. 1 illustrates operation of a differential satellite positioning system in simplified form. An SATPS reference station 11 includes an SATPS signal antenna 13 and associated SATPS receiver/processor 15, a DSATPS communications transmitter 17 and communications antenna 19, where the location of the SATPS antenna is known with high accuracy at any time. A roving or mobile SATPS station 21, including an SATPS antenna 23 and associated SATPS receiver/processor 25, a DSATPS communications receiver 27 and communications antenna 29, is spaced apart from the SATPS reference station 11 on or adjacent to the Earth's surface. Presently, an SATPS signal antenna is approximately omni-directional so that SATPS signals can be received from any area of the sky, except near the horizon, without requiring that the antenna be "pointed."

An SATPS antenna receives SATPS signals from a plurality (preferably three or more) of SATPS satellites and passes these signals to an SATPS signal receiver/processor, which (1) identifies the SATPS satellite source (satellite number or other indicia) for each SATPS signal, (2) determines the time at which the incoming SATPS signals were measured at the antenna, and (3) determines the present location of the SATPS antenna from this information and from information on the ephemerides, almanac and ionosphere for each identified SATPS satellite. In one embodiment, the SATPS antenna and SATPS receiver/processor are part of the user segment of a particular SATPS, the Global Positioning System, as discussed by Tom Logsdon in *The NAVSTAR Global Positioning System,* Van Nostrand Reinhold, 1992, pp. 17–90. Format and content for the navigation message transmitted by a satellite as part of an SATPS signal are set forth in the document GPS Interface Control Document ICD-GPS-200, published by Rockwell International Corporation, Satellite Systems Division, Revision B-PR, Jul. 3, 1991. The information from this material is incorporated by reference herein.

The SATPS reference station 11 may be stationary or may be moving, with location coordinates that are accurately known as a function of time t. SATPS satellites 31A, 31B, 31C, 31D that are visible from the reference station (referred to as an "reference/visible" satellites) transmit SATPS signals that are received by the reference station 11 and by the mobile station 21 and are processed to determine (uncorrected) present location, velocity and time information on that station. The reference station 11 optionally transmits DSATPS corrections and transmits selected ephemerides, almanac, ionosphere and/or time information, using a reference station communications transmitter 17 that may be part of, or operated independently of, the reference station. The reference station communications transmitter 17 has all relevant, currently valid ephemerides, almanac, ionosphere and/or time information for the reference/visible satellites and the present location of the reference station 11 stored at the transmitter or otherwise available.

The reference station communications transmitter 17 may be spaced apart from, and receive SATPS signal information from, the reference station 11. The reference station communications transmitter 17 and antenna 19 broadcast relevant ephemerides, almanac, iono, time and satellite id. information and optional DSATPS correction information for the reference/visible satellites on a selected frequency, such as a cellular phone frequency or an FM subcarrier signal frequency, that does not interfere with receipt of the SATPS signals from the satellites. The satellite id., ephemerides, almanac, iono, time, satellite id. and DSATPS correction information is received by a mobile station 21 and is used to rapidly (re)acquire satellite lock according to the invention. Optionally, the reference station 11 and the reference station communications transmitter 17 may serve any number of nearby mobile stations 21. Alternatively, the reference station communications transmitter 17 may be part of the reference station 11. The communications link may be provided by a cellular telephone, by FM subcarrier or by any other suitable communications system.

The DSATPS correction information, if transmitted, is preferably transmitted moderately often, perhaps once every 1–10 sec, or not very often, once every 10–600 sec, to account for changes that may occur in such a time interval. The ephemerides, almanac, iono and/or time information for each identified reference/visible satellite may include Keplerian orbital parameters or other equivalent orbital parameters, including a satellite location vector $r_s(t'')$ and a satellite velocity vector $v_s(t'')$ for a time t" (>t) that is related in a determinable manner to the present time t. For example, the time t" could be chosen to be the present time t plus a selected positive increment $\Delta t_s$, such as $\Delta t_s=5$ sec, in order to give the mobile station a "head start" by approximately $\Delta t_s$ in determining the shifted frequency range to be searched for a satellite signal to be acquired. This ephemerides, almanac and iono information may also be transmitted moderately often, perhaps once every 5–60 sec, in a "round robin" sequence for the reference/visible satellites. Determination of a shifted frequency range to be searched is presented after discussion of use of the invention is completed here. Preferably, however, the ephemerides, almanac, iono and/or time information is transmitted less often, once every 60–1200 sec, to minimize the increased bandwidth requirements. A preferred update rate here is once every 600 sec. The ephemerides, almanac, iono and/or time information is received at and stored in a communications receiver at the SATPS mobile station and is made available to the SATPS signal receiver/processor at the mobile station whenever SATPS signal (re)acquisition is required.

Some of this information may have been acquired as part of an RTCM Type 1, Type 3 or Type 9 message. RTCM (Radio Technical Communications Marine) messages are transmitted by satellites and other sources in a format that includes several message types, including Types 1, 3 and 9, that convey information needed for location determination by a user of such messages. In the RTCM format, the Type 1 and Type 9 messages carry clock corrections, combined with location-dependent pseudorange corrections, for specified locations that are transmitted as part of a Type 3 message. A network that provides RTCM messages transmits auxiliary massages containing information that allows a user, such as a new station, to recover a satellite clock correction from the Type 1 pseudorange message, by extracting the location-dependent corrections associated with the location transmitted in a Type 3 message. Other RTCM message types carry special or proprietary format information that may be needed for other purposes.

In a normal sequence of SATPS signal (re)acquisition, the procedures and corresponding times consumed $\Delta t$ are as follows:

(1) obtain Doppler shift and/or pseudorange measurements for the highest elevation SATPS satellites, using the ephemerides, almanac, ionosphere and/or present (or last known) time and last known location of the user ($\Delta t$=2–5 sec);

(2) synchronize the time to available millisecond time signals ($\Delta t$=0.2–0.5 sec);

(3) determine and synchronize the time with subframe synchronization ($\Delta t$=6–12 sec);

(4) obtain the present ephemeris information from the navigation messages ($\Delta t$=30–60 sec); and (5) compute the user's present location, based upon receipt of SATPS signals from identified satellites ($\Delta t$=1 sec).

Performance of these procedures requires 39–79 sec for one satellite and must be uninterrupted. The actual time required can be far greater than 79 sec, if, as often happens, the procedure is interrupted before completion. A 30-second frame of a navigation message includes five 6-second subframes, and the first three subframes must be received intact. If receipt of one of the first three subframes is interrupted, receipt of a new frame, requiring an additional 30 seconds, is required. Subframe interruption can easily occur if the mobile station 21 is moving along a tree-lined road or along a street with several tall structures adjacent to the street.

In many applications of SATPS, a radio link is used to provide DSATPS corrections of pseudorange measurements or other measurements to enhance the accuracy of SATPS antenna location, by removing many of the errors common to two nearby SATPS stations. Here, a DSATPS communications link, which can be implemented using radio waves, cellular signals, FM subcarrier signals or other suitable signals, is used as a reference station transmitter to provide present ephemerides, almanac, iono and/or time information for the reference/visible satellites, for initial acquisition or reacquisition of SATPS signals by a mobile station (referred to as a "new station"). This reduces the signal (re)acquisition time by at least 30–60 sec, and by a greater amount if account is taken of the possibility of navigation message interruption.

Ephemeris information, not including the TLM word, the handover word, redundant bits and parity check information, for a single SATPS satellite presently requires as many as eight out of ten words with 24 useful bits each from three subframes plus checksum bits, or between 512 and 576 bits of information in the navigation message. At any moment and at any location on the Earth's surface, at most about 8 SATPS satellites are visible above a reasonable horizon mask so that at most about 8×576=4,608 bits need be transmitted for the ephemerides for 8 in-view satellites. Almanac health and other almanac data for the satellites would require an additional estimated 4608 bits, but these bits may be transmitted less often than the ephemerides bits. Last known location and time and ionospheric modelling information would require an estimated additional 112 bits. The estimated maximum bit count for ephemerides, almanac, iono and/or time information is approximately 9,328 bits for 8 in-view or reference/visible satellites. Almanac information is useful if the new station is powering up after a long time interval (e.g., tens of minutes or hours) but is not usually required if the new station seeks to reacquire and lock onto an SATPS signal the new station has just lost.

This estimated number of information bits (9,328) would change if more or fewer satellites are visible or if the number of bits required for ephemerides, almanac, iono and/or time information for a single satellite changes. However, the precise bit count is not critical here. If the communications link operates at 9600 Baud, as do some typical cellular phone links, transmission of these 9,328 bits of ephemerides, almanac and iono information would require about 1.0 sec, not counting header and footer bits for the packets or frames used to transport this information. The total time required for transmission of this information, including header and footer bits, is not likely to exceed 1.2 sec. Where transmission of the ephemerides, almanac, iono and/or time information occurs in parallel with (or before) the remainder of the power-up and (re)acquisition sequence, this reduces the estimated minimum time for SATPS signal (re)acquisition from 39–79 sec to no more than 10–20 sec, which is dominated by subframe synchronization and collection time and can be reduced further. The portion of this reduced signal (re)acquisition time devoted to subframe synchronization and collection can probably be further reduced, from 6–12 sec to 4–10 sec or less, using efficient phase integer search techniques and knowledge of the last known location of the mobile station, if available. If the ephemerides, almanac, iono and/or time information has not been transmitted and received before signal (re)acquisition is required, the estimated minimum time for signal (re) acquisition is about 39 sec, due in large part to the necessity to obtain the ephemerides information ($\Delta t$=30–60 sec) before signal identification and lock can be attempted. With the new approach disclosed here, the estimated minimum time for signal (re)acquisition is <39 sec and can be reduced to about 10–20 sec, as discussed below.

Assume that a new station 21 has lost its lock on one or more (or all) visible SATPS satellites 31A, 31B, 31C and/or 31D, or that the new station is powering up after a period of no activity. This new station 21 will need to (re)acquire, and to lock onto, one or more of the reference/visible satellites, in order to provide needed location and/or velocity and/or time information for this new station. A reference station 11 and reference station communications transmitter 17 are assumed to be located near the new station 21 (i.e., within 250 kilometers) so that DSATPS correction information is optionally available by communications link.

Figure 2:
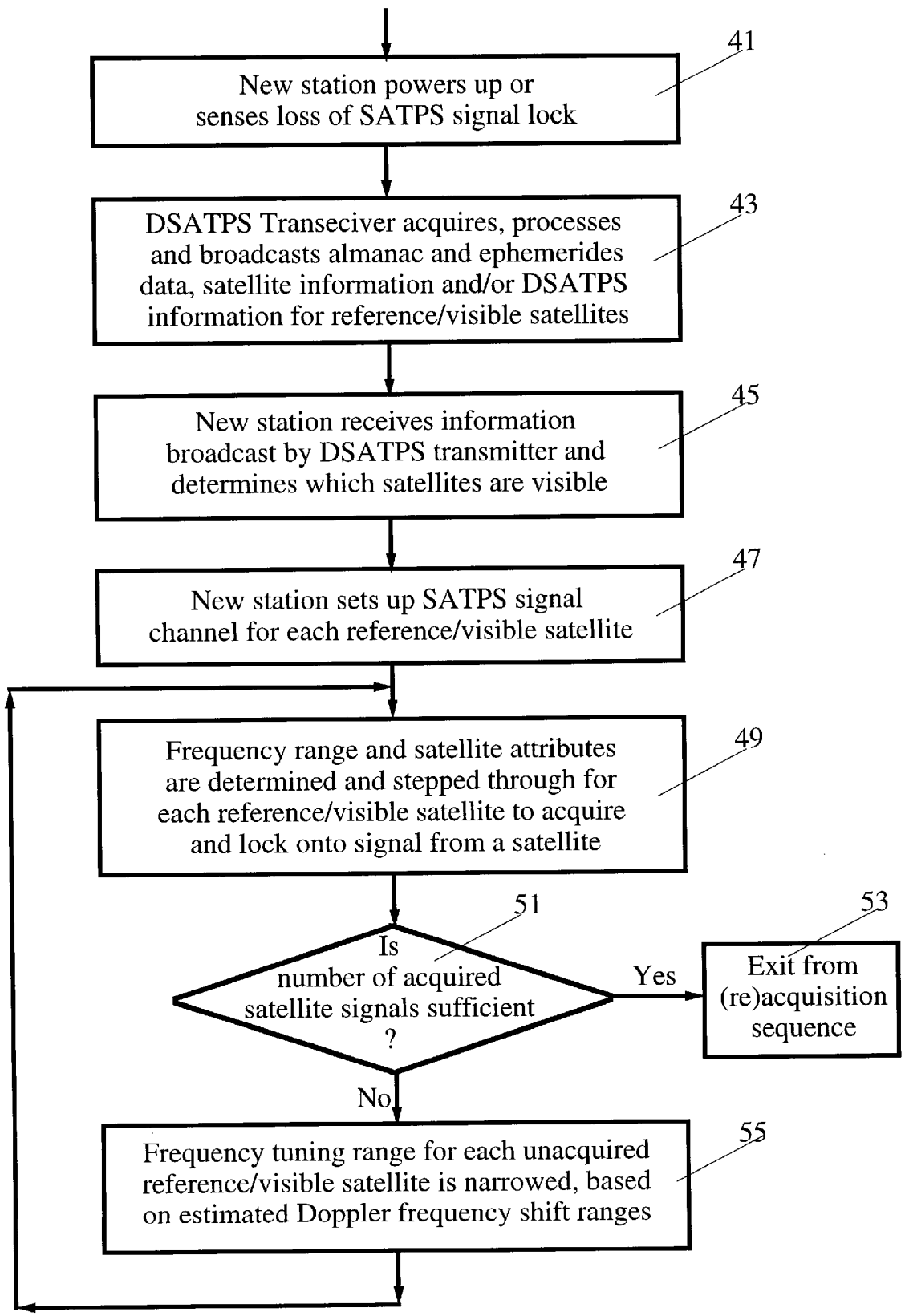
FIG. 2 is a flow chart illustrating acquisition of, and lock-on for, one or more SATPS satellites signals by a new SATPS station according to one embodiment of the invention.

One embodiment of the procedure for (re)acquisition and lock-on for the visible SATPS satellites is illustrated in FIG. 2. In step 41, the new station either powers up or senses that it has lost lock on all SATPS satellites. In step 43, the reference station communications transmitter 17 receives satellite id., ephemerides, almanac, iono and/or time information for the reference/visible satellites and (optionally) DSATPS information for the reference/visible satellites, referenced to the reference station 11, and processes and transmits this satellite information. In step 45, the new station communications receiver 29 at the new station receives the satellite information broadcast by the reference station communications transmitter 17 and determines which SATPS satellites are visible at the reference station. In step 47, the new station 21 sets up a sufficient number of SATPS signal channels (one or more) to receive SATPS signals directly from the identified reference/visible SATPS satellites. In step 49, the frequency range and other SATPS signal attributes (PRN codes, etc.) are determined and stepped through for each of these reference/visible satellites, to acquire and lock onto the SATPS signals from one or more of these reference/visible satellites. Steps 41, 43, 45 and 49 of the signal (re)acquisition sequence set forth above would be performed here, for example by searching simultaneously over one to eight channels, each corresponding to a different reference/visible SATPS satellite. Alternatively, two or more channels can be used to search in parallel for signals from a reference/visible satellite. It may occur that one or more reference/visible satellites is not visible from the new station location, or that the SATPS signal from this satellite is too weak. Normally, about eight satellites should be visible from the reference station 11 so that a subset of four or more reference/visible satellites should be visible from most locations of the new station 21.

After a first SATPS satellite signal is acquired from among the reference/visible satellites, the system determines, in step 51, if the number of satellites now acquired is sufficient to allow determination of location and/or time. If the answer is "yes," the system exits from this (re)acquisition mode in step 53. If the answer is "no," the frequency tuning range for all the other reference/visible satellite signals (not yet acquired) is narrowed, in step 55, to a smaller frequency range around the calculated frequency, based upon estimated frequency source offset and estimated Doppler shift frequency ranges, and the system returns to step 49, but with narrowed frequency ranges for the subsequent searches for any of the remaining reference/visible satellites.

Once an SATPS satellite is tracked and its SATPS signal is acquired and locked onto, the frequency range for the search for the remaining reference/visible satellites can be narrowed, because an estimate can be made of the offset or error in frequency range(s) used by the new station frequency source (for all satellites). Two sources of significant bias or error in SATPS signal acquisition are (1) Doppler frequency shift due to the non-zero velocity of a satellite relative to an SATPS receiver/processor and (2) SATPS receiver/processor time base error relative to the more accurate satellite time base, which relies on an atomic clock. Where a relatively inexpensive oscillator or other frequency generator ("clock") is used to provide a time base for an SATPS receiver/processor, the time base error can be about ten times as large as the Doppler shift bias. For example, the maximum Doppler shift frequency may be 5–8 kHz, and the time base error may correspond to a frequency error of 47 kHz (30 ppm for a frequency of 1.575 GHz). Use of a relatively expensive and more accurate atomic clock to provide a time base for the SATPS receiver/processor will reduce the time base error. As soon as a signal from a first identified reference/visible satellite is recognized, all available resources (SATPS signal analysis channels, etc.) can be focused on that satellite to (re)acquire and lock onto the corresponding SATPS signal. The time base error of the new station receiver/processor, which is approximately the same for any SATPS satellite, can be determined, and the frequency range for subsequent searches for the remaining reference/visible SATPS satellites can be reduced to a corrected Doppler shift frequency range, which is much smaller than the original frequency range that must be searched.

The system disclosed here allows rapid (re)acquisition of SATPS satellite lock-on for one or more reference/visible satellites. Whereas, (re)acquisition of a first SATPS satellite may require a time interval of several minutes, using conventional approaches, the invention disclosed here allows (re)acquisition of a first SATPS satellite signal in dramatically reduced time, depending in part on the number of satellite signal acquisition channels used.

Further, the clock used to provide a time base for the SATPS receiver/processor at the new station may be much less precise using the disclosed invention for satellite acquisition. For example, a receiver clock that is accurate to within 2.5 ppm or lower, with a representative cost of the order of $25, is often required for reasonably prompt SATPS satellite acquisition in a conventional setting. A receiver clock that is accurate to within 10 ppm, with a representative cost of about $5, will suffice for the invention disclosed here; and it is possible that a clock that is merely accurate to within 20 ppm can be used with the disclosed invention, which would reduce the cost of the clock further.

In step 51, the new station determines whether the number of acquired SATPS signals it has acquired is sufficient to allow location determination (requires at least three) or to allow location and time offset determination (requires at least four). If the number of (re)acquired SATPS satellite signals is sufficient, the new station exits from the (re) acquisition sequence in step 53 and determines the present location and/or time offset for the new station. If the number of (re)acquired SATPS signals is not yet sufficient, in step 55 the new station returns to steps 49 and 51 and repeats this part of the (re)acquisition sequence.

The new station 21 need not store the SATPS satellite ephemerides, almanac and iono information itself. The new station 21 can rely upon and make use of this information received from the reference station transmitter 17 when the new station is operated, and thus use smaller permanent memory for general operations. Alternatively, the new station 21 can receive and store the ephemerides, almanac and/or iono information for each identified reference/visible satellite for the normal time intervals, about two hours, for which the ephemerides, almanac and iono information is valid for that satellite.

Figure 3:
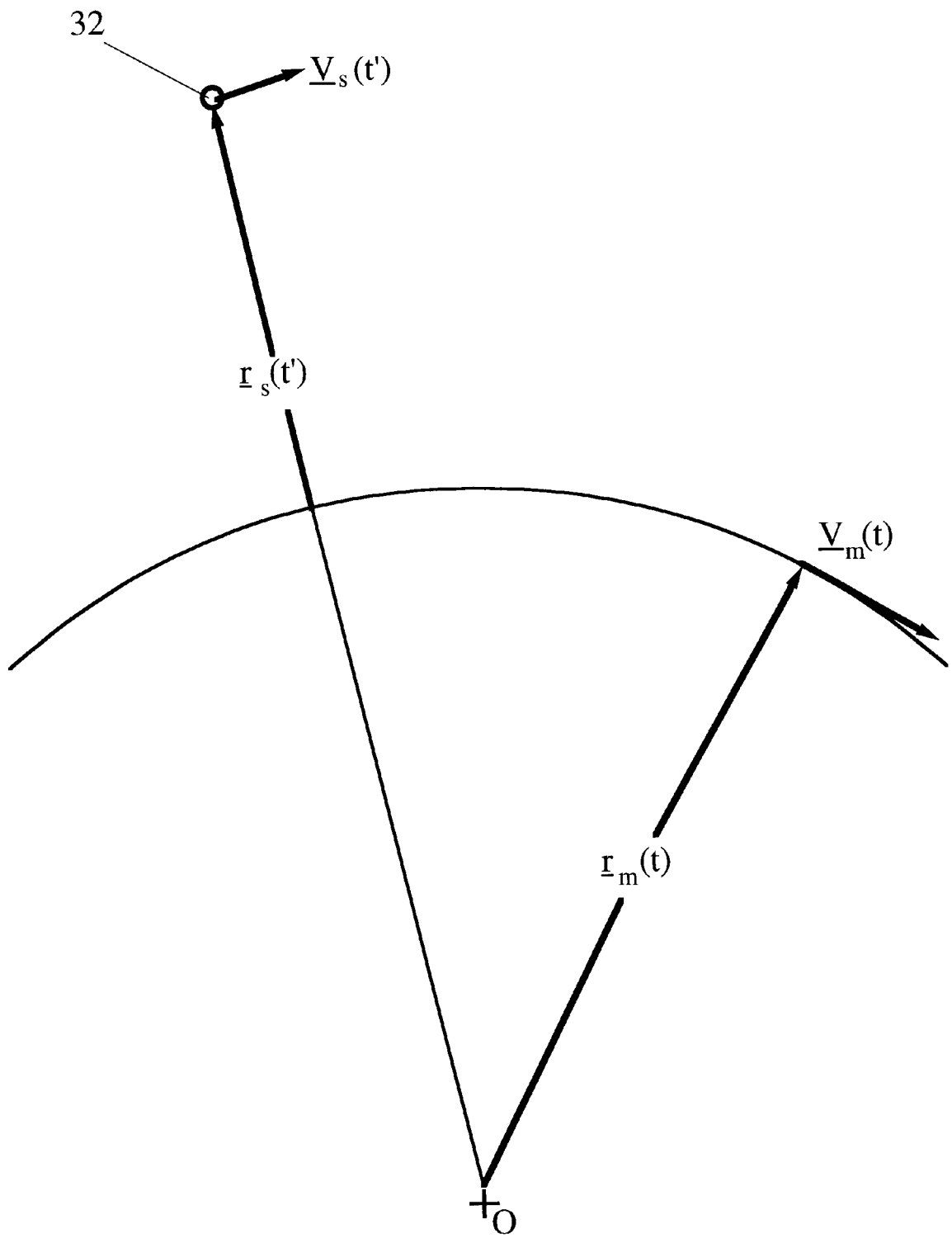
FIG. 3 schematically illustrates the effect of location and velocity of a transmitting satellite, relative to the location and velocity of a ground observer, on the shift in frequency of a satellite signal received by the ground observer.

FIG. 3 illustrates how a frequency shift arises in a signal received by a ground observer (moving or stationary) from a satellite in orbit. A mobile or mobile (new) station 21, with unknown (or estimated) present location vector $r_m(t)$ and present velocity vector $v_m(t)$, receives at time t an SATPS signal S(t) with characteristic frequency $f_s$, as transmitted by a satellite 32. At the time t' the satellite 32 transmitted the signal S(t'), the satellite had a location vector $r_s(t')$ and a velocity vector $v_s(t')$, where the times t and t' are related approximately by the relation $$t-t'=|r_m(t)-r_s(t')|/c' \quad (1)$$

and c' is a representative velocity of propagation of electromagnetic signals in the ambient medium. According to Moller, *The Theory of Relativity*, Oxford, Clarendon Press, First Edition, 1952, page 62, the "Doppler" shift in frequency of a signal received by the mobile station from the satellite is given by $$\Delta f = f_r \text{ (received)} - f_s \quad (2)$$
$$= f_s g(r_m(t) - r_s(t')) \cdot (v_m(t) - v_s(t'))/c'|r_m(t) - r_s(t')|,$$
$$g = ([1 - (v_m(t) - v_s(t'))^2 / c'^2])^{1/2}. \quad (3)$$

Here, the ratio $|v_m(t)-v_s(t')|c'$ is quite small, at most about $1.3 \times 10^{-5}$ so that the factor g can often be replaced by 1 in Eq. (2).

The scalar product $r_{ms}=(r_m(t)-r_s(t'))\cdot(v_m(t)-v_s(t'))$ of the difference vectors can be negative, zero or positive so that the frequency shift $\Delta f$ can have either signum, with a magnitude as high as about $1.3 \times 10^{-5} f_s$, or about 20 kHz for a carrier frequency $f_s=1.575$ GHz. The total frequency shift range (+ and −) to be searched is thus as high as 40 kHz, apart from corrections for ionospheric and tropospheric time delays and other perturbations. However, if the scalar product $r_{ms}$ is known to have a particular signum (+ or −), the total frequency range to be searched is reduced by a factor of two. The location and velocity vectors $r_s(t')$ and $v_s(t')$ for a chosen reference/visible satellite (e.g., the satellite with largest elevation angle) and pseudorange-based corrections $\Delta t_{cor}$ for the time differential t−t' are known here, through receipt of most of this information from the DSATPS communications transmitter 17 or from the reference station 11. The remaining unknown variables in Eq. (2), new station location vector $r_m(t)$ and velocity vector $v_m(t)$, can be estimated, and a reduced range of frequency shifts $\Delta f$ about the carrier frequency $f_s$ can be identified from Eq. (2), using the known values of $r_s(t')$ and $v_s(t')$ and the estimated values of $r_m(t)$ and $v_m(t)$.

Two or more of the channels of the SATPS mobile station receiver/processor 25 are assigned to search for and identify the frequency-shifted signal received from this chosen satellite. For example, if eight receiver/processor channels are assigned to a parallel search, each of these channels can be assigned a frequency search interval of about (8 kHz/8)=1 kHz, which can be adequately covered in 2–5 sec for the first-acquired Doppler-shifted signal and in an estimated 1–3 sec for subsequent Doppler-shifted signals. Acquisition and lock onto a GPS signal from the first satellite will require an estimated time $$\Delta t(n=1)(\text{sec}) = 2\text{–}5 \text{ (Doppler shift)} + \quad (4)$$
$$0.2\text{–}0.5 \text{ (time synchronization)} +$$
$$4\text{–}10 \text{ (subframe synchronization)}$$
$$= 6.2\text{–}15.5 \text{ sec}.$$

Figure 4A:
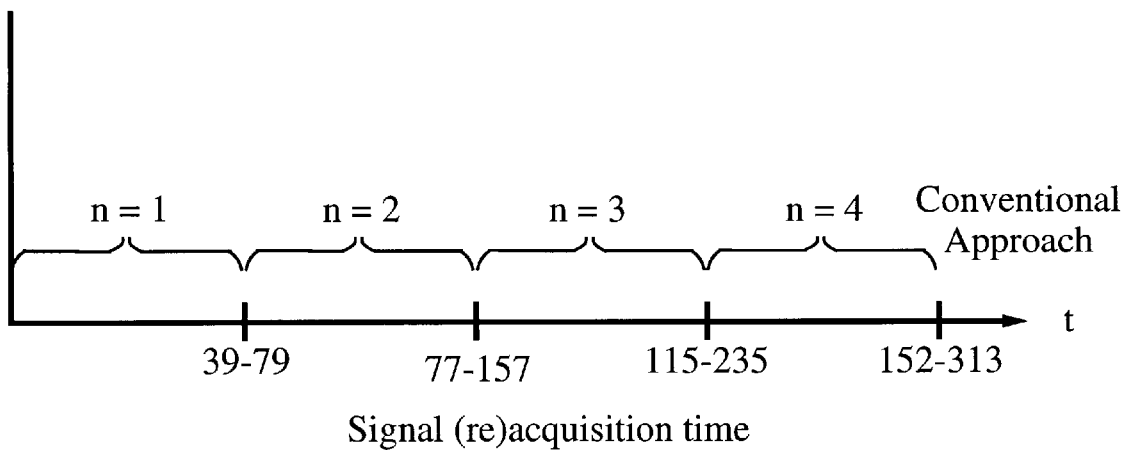
FIGS. 4A, 4B and 4C graphically compare signal (re) acquisition times for the new approach and for a conventional approach.
Figure 4B:
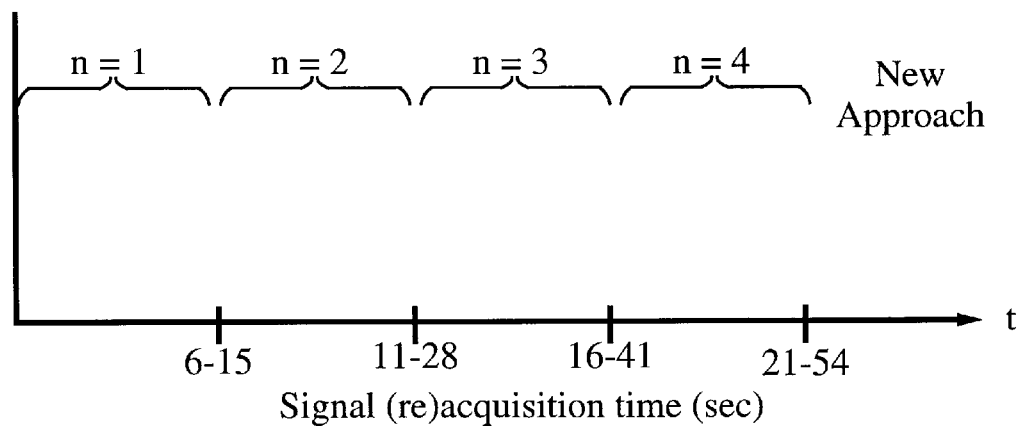
Figure 4C:
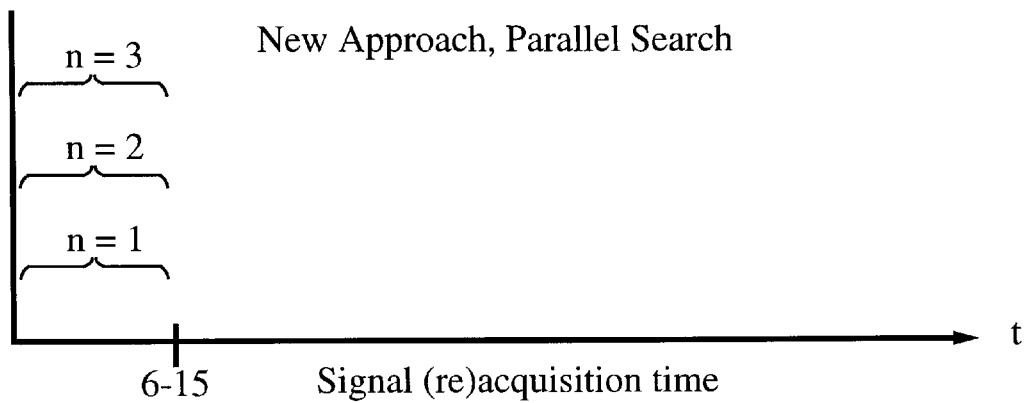

Once the first frequency-shifted satellite signal is identified and locked onto, the remaining (seven) channels are assigned to a second selected satellite, and the process is repeated for this second satellite, for a third selected satellite with the remaining (six) channels, and so on. Acquisition of each additional satellite beyond the first is estimated to require $$\Delta t(n>2) \text{ (sec)}=1\text{–}3 \text{ (Doppler shift)}+4\text{–}10 \text{ (subframe synch)} \quad (5)$$

or an estimated 5–13 sec each. Computation of the present location and observation after four or more GPS signals are (re)acquired requires an estimated 1 sec. If (re)acquisition of lock onto four GPS satellite signals is sufficient and eight receiver/processor channels are used for a parallel search, the time required for achievement of lock onto four satellites is estimated to be 22–55 sec. These numbers should be compared with the estimated minimum times for GPS signal (re)acquisition, using a conventional approach, of 39–79 sec for the first-acquired signal and 38–78 sec for each additional signal. FIGS. 4A and 4B graphically compare the differences in signal (re)acquisition time for the new approach disclosed here and the conventional approach. FIG. 4C graphically indicates the signal (re)acquisition time for the new approach where SATPS signal acquisition for two or more reference/visible satellitese proceeds in parallel. The time reduction using the new approach is dramatic.

The new station will use a frequency source to help determine the frequencies used for the search for the incoming SATPS signal to be (re)acquired. In the usual situation, this new station frequency source will have a frequency instability (drift, etc.) or other frequency error so that the apparent frequency shift for the incoming SATPS signal will differ from the computed Doppler shift. This error will require a search over a modest range of frequencies, centered approximately at the estimated Doppler shift. After the first SATPS signal is (re)acquired, the new station frequency source error can be estimated, and a reduced range of frequency shifts, centered at the estimated Doppler shift for a second reference/visible satellite, can be used to (re) acquire the SATPS signal for this second (or subsequent) reference/visible satellite. This reduced range of frequency shifts $\Delta f$ will normally have only one signum and will have an estimated maximum value of 5–8 kHz.

If a stable frequency source can be provided for the new station, preferably with a frequency error of no more than one part in $10^6$, the range of incoming signal frequencies to be searched by the new station receiver/processor for SATPS signal (re)acquisition may be further reduced, to perhaps as low as 0.5–3 kHz.

In a preferred mode of operation, ephemerides, almanac, iono and/or time information and optional DSATPS correction information are received and used to reduce the time required for SATPS signal (re)acquisition and to accurately calculate location fixes. Almanac and iono data are used to facilitate, and reduce the time required for, SATPS signal (re)acquisition, and ephemerides data are used for the subsequent location fixes.

If, say, eight SATPS satellites are reference/visible, at most about 4,608 bits are required for the ephemerides information for these eight satellites. Last known location/time and iono data require an estimated additional 112 bits, and almanac data require an estimated additional 4,608 bits. Use of the ephemerides, almanac, iono and/or time information will help to reduce the frequency range initially searched, as indicated above. The ephemerides, almanac, iono and/or time information can be transmitted to a new station at time intervals of between once per second and once per 600 sec for this purpose.

The new station may have received and stored relevant ephemerides, almanac and/or iono information for each satellite, including estimated time intervals for which each satellite is visible from a known, nearby location. If relevant orbital data are available for an identified satellite that is visible from this known, nearby location (referred to as a "new station/visible" satellite), the new station can estimate the location vector $r_s(t')$ and velocity vector $v_s(t')$ for that satellite and can estimate the Doppler frequency shift for SATPS signals received from that satellite. The new station can then proceed as above, without relying on SATPS signal information received from a nearby reference station.

We claim:

1. A method for rapid acquisition of one or more Satellite Positioning System (SATPS) satellite signals at an SATPS station that seeks to acquire or to reacquire one or more SATPS signals, the method comprising the steps of:

(1) receiving and analyzing SATPS signals from one or more SATPS signal-transmitting satellites at an SATPS reference station and transmitting estimated reference station location and satellite ephemeris information for at least one SATPS satellite that is visible from the reference station, referred to as a "reference/visible satellite", whose SATPS signal is received at the reference station with an associated carrier signal frequency;

(2) receiving at least one SATPS signal from at least one reference/visible satellite at a second SATPS station, which seeks to acquire or reacquire and to lock onto an SATPS signal from one or more reference/visible satellites, the second station having Doppler shift means for searching an incoming SATPS signal over a selected range of Doppler shifted carrier frequencies;

(3) receiving the estimated reference station location and the satellite ephemeris information at the second station, and estimating a Doppler shifted carrier frequency range for the at least one SATPS signal, using the received satellite ephemeris information, by:

(3a) estimating a location vector $r_m$ and a velocity vector $v_m$ for the second station at the time the second station receives the SATPS signals; and (3b) estimating a frequency $f = f_s + \Delta f$ in the Doppler frequency shift range for the at least one SATPS signal received, where $f_s$ is a known carrier frequency with which the SATPS signals are transmitted, by estimating the frequency shift using the relation $$\Delta f = f_r(\text{received}) - f_s$$
$$= f_s(r_m(t) - r_s(t')) \cdot (v_m(t) - v_s(t')) / \{c' | r_m(t) - r_s(t')|\},$$

where c' is a representative velocity of propagation of electromagnetic signals in the ambient medium through which the SATPS signals propagate, $r_m(t)$ and $v_m(t)$ are estimated location and velocity vectors for the second station at a selected time t, and $r_s(t')$ and $v_s(t')$ are estimated location and velocity vectors for the selected reference/visible satellite at a selected time t'; and (4) scanning the estimated Doppler shifted carrier frequency range to acquire and to lock onto an SATPS signal from the at least one reference/visible satellite, whereby a time interval required to acquire and lock onto the at least one reference/visible satellite does not exceed about 39 seconds.

2. The method of claim 1, further comprising the step of acquiring and locking onto said SATPS signal from said at least one reference/visible satellite in a time interval that does not exceed about 20 seconds.

3. The method of claim 1, further comprising the steps of:

(5) after said SATPS signal from said at least one reference/visible satellite is acquired and locked onto by said second station, estimating a frequency error associated with a second station signal analyzer and determining a second reduced frequency range within which an additional SATPS signal is received by said second station from an additional reference/visible satellite, based upon the frequency error estimated by the signal analyzer;

(6) estimating a Doppler frequency shift for the additional SATPS signal received by said second station; and (7) using the second reduced frequency range to search for, identify, acquire and lock onto the additional SATPS signal at said second station.

4. The method of claim 3, further comprising the step of acquiring and locking onto said SATPS signal from said additional reference/visible satellite in a time interval that does not exceed about 13 seconds.

5. The method of claim 1, further comprising the step of choosing said Satellite Positioning System to be a Global Positioning System or a Global Orbiting Navigation Satellite System.

6. The method of claim 1, further comprising the steps of:

(5) after said SATPS signal from said at least one reference/visible satellite is acquired and locked onto by said second station, estimating a frequency error associated with said at least one reference/visible satellite carrier frequency and determining a second Doppler shifted carrier frequency range within which an additional SATPS signal is received by said second station from an additional reference/visible satellite, based upon the estimated frequency error;

(6) estimating a second Doppler shifted carrier frequency for the additional SATPS signal received by said second station; and (7) using the estimated second Doppler shifted carrier frequency to acquire and lock onto the additional SATPS signal at said second station.

7. A method for rapid acquisition of one or more Satellite Positioning System (SATPS) satellite signals at an SATPS station that seeks to acquire or to reacquire one or more SATPS signals, the method comprising the steps of:

(1) receiving and analyzing SATPS signals from one or more SATPS signal-transmitting satellites at an SATPS reference station and transmitting an estimated reference station location vector and information on location vector $r_s$ and velocity vector $v_s$ for at least one SATPS satellite that is visible from the reference station, referred to as a "reference/visible satellite", whose SATPS signal is received at the reference station with an associated carrier signal frequency;

(2) receiving at least one SATPS signal from at least one reference/visible satellite at a second SATPS station, which seeks to acquire or reacquire and to lock onto an SATPS signal from one or more reference/visible satellites, the second station having Doppler shift means for searching an incoming SATPS signal over a selected range of Doppler shifted carrier frequencies;

(3) receiving the location vector and velocity vector information for the at least one reference/visible satellite at the second station, and estimating a Doppler shifted carrier frequency range for the at least one SATPS signal, using the received satellite location vector and velocity vector information, by:

(3a) estimating a location vector $r_m$ and a velocity vector $v_m$ for the second station at the time the second station receives the SATPS signals; and (3b) estimating a frequency $f=f_s+\Delta f$ in the Doppler frequency shift range for the at least one SATPS signal received, where $f_s$ is a known carrier frequency with which the SATPS signals are transmitted, by estimating the frequency shift using the relation $$\Delta f = f_r(\text{received}) - f_s$$
$$= f_s(r_m(t) - r_s(t')) \cdot (v_m(t) - v_s(t'))/\{c' \mid r_m(t) - r_s(t') \mid\},$$

where c' is a representative velocity of propagation of electromagnetic signals in the ambient medium through which the SATPS signals propagate, $r_m(t)$ and $v_m(t)$ are estimated location and velocity vectors for the second station at a selected time t, and $r_s(t')$ and $v_s(t')$ are the location and velocity vectors for the at least one reference/visible satellite at a selected time t'; and (4) scanning the estimated Doppler shifted carrier frequency range to acquire and to lock onto an SATPS signal from the at least one reference/visible satellite, whereby a time interval required to acquire and lock onto the at least one reference/visible satellite does not exceed about 39 seconds.

8. The method of claim 1, further comprising the step of acquiring and locking onto said SATPS signal from said at least one reference/visible satellite in a time interval that does not exceed about 20 seconds.

9. The method of claim 7, further comprising the steps of:

(5) after said SATPS signal from said at least one reference/visible satellite is acquired and locked onto by said second station, estimating a frequency error associated with a second station signal analyzer and determining a second reduced frequency range within which an additional SATPS signal is received by said second station from an additional reference/visible satellite, based upon the frequency error estimated by the signal analyzer;

(6) estimating a Doppler frequency shift for the additional SATPS signal received by said second station; and (7) using the second reduced frequency range to search for, identify, acquire and lock onto the additional SATPS signal at said second station.

10. The method of claim 9, further comprising the step of acquiring and locking onto said SATPS signal from said additional second station/visible satellite in a time interval that does not exceed about 13 seconds.

11. The method of claim 7, further comprising the step of choosing said Satellite Positioning System to be a Global Positioning System or a Global Orbiting Navigation Satellite System.

12. The method of claim 7, further comprising the steps of:

(5) after said SATPS signal from said at least one reference/visible satellite is acquired and locked onto by said second station, estimating a frequency error associated with said at least one reference/visible satellite carrier frequency and determining a second Doppler shifted carrier frequency range within which an additional SATPS signal is received by said second station from an additional reference/visible satellite, based upon the estimated frequency error;

(6) estimating a second Doppler shifted carrier frequency for the additional SATPS signal received by said second station; and (7) using the estimated second Doppler shifted carrier frequency to acquire and lock onto the additional SATPS signal at said second station.

* * * * *